United States Patent [19]

Walters et al.

[11] 4,271,094

[45] Jun. 2, 1981

[54] MALLEABLE STOP FOR ENGINE CONTROL ELEMENT

[75] Inventors: L. Kirk Walters, Rochester, Mich.; Richard K. Judd; Terrance J. Atkins, both of Rochester, N.Y.

[73] Assignee: General Motors Corporation, Detroit, Mich.

[21] Appl. No.: 938,078

[22] Filed: Aug. 30, 1978

[51] Int. Cl.[3] ........................ F01B 11/02; F02M 1/00; F16F 1/36

[52] U.S. Cl. ................................ 261/39 B; 92/85 R; 267/139; 267/153; 188/1 C

[58] Field of Search ............... 92/85 R; 267/139, 153; 188/1 C, 196 R; 261/39 B

[56] References Cited

U.S. PATENT DOCUMENTS

| | | | |
|---|---|---|---|
| 1,715,406 | 6/1929 | Christenson | 92/85 R |
| 2,360,539 | 10/1944 | Ballard | 92/85 R |
| 2,970,825 | 2/1961 | Smitley . | |
| 3,190,623 | 6/1965 | Ball . | |
| 3,208,301 | 9/1965 | Chaivre et al. . | |
| 3,392,635 | 7/1968 | Sperl et al. | 92/121 X |
| 3,396,948 | 8/1968 | Stettner . | |
| 3,454,397 | 7/1969 | Yoshioka et al. | 188/1 C |
| 3,465,650 | 9/1969 | Gluck | 92/85 R |
| 3,469,504 | 9/1969 | Neighorn | 92/85 R |
| 3,685,809 | 8/1972 | Manning | 261/39 B |
| 3,757,900 | 9/1973 | Gischlar | 188/1 C |
| 3,773,023 | 11/1973 | Taylor | 123/119 F |
| 3,807,281 | 4/1974 | Perkins | 92/85 R |
| 3,844,388 | 10/1974 | Ditlinger | 188/196 R |
| 3,934,565 | 1/1976 | Matsumoto et al. | 123/119 F |
| 3,965,223 | 6/1976 | Benjamin et al. | 261/39 B |
| 3,991,731 | 11/1976 | Benjamin | 123/119 F |
| 4,027,634 | 6/1977 | Benjamin | 123/119 F |
| 4,033,232 | 7/1977 | Benjamin et al. | 91/47 |
| 4,050,726 | 9/1977 | Hablitzel | 188/1 C |
| 4,200,596 | 4/1980 | Iiyama et al. | 137/67 X |

*Primary Examiner*—Irwin C. Cohen
*Attorney, Agent, or Firm*—C. K. Veenstra

[57] ABSTRACT

In a vacuum motor for opening an internal combustion engine carburetor choke to a vacuum break position, a stop is engaged between the actuating diaphragm and a base member to establish the vacuum break position. The stop is formed of a malleable material which plastically deforms slightly upon engagement—and thus gradually changes the vacuum break position upon repeated engagement—to compensate for changes in engine operating characteristics over an extended period of engine operation.

19 Claims, 25 Drawing Figures

MALLEABLE STOP FOR ENGINE CONTROL ELEMENT

This invention relates to a stop for an engine control element which is formed of a malleable material that plastically deforms slightly upon engagement and thus gradually changes the stopped position of the engine control element to compensate for changes in engine operating characteristics over an extended period of engine operation.

The automatic choke mechanism in the carburetor of an internal combustion engine generally includes a vacuum motor with an actuating member which pulls the carburetor choke to a partially open "vacuum break" position in response to the increase in manifold vacuum which occurs after the engine is started. All such carburetors have a stop which limits the travel of the actuating member to establish the vacuum break position, and in some applications a manually adjustable stop has been provided to set the vacuum break position while for other applications automatic controls have been proposed to vary the vacuum break position with changes in engine operating conditions.

It has been observed that engine operating characteristics change over an extended period of engine operation and that engine operation can be improved by increasing the travel of the actuating member to open the choke to a new, slightly increased, vacuum break position during that period. This invention provides a stop which limits the choke opening movement of the actuating member to establish the vacuum break position and which is formed of a malleable material that deforms slightly upon engagement; as it is repeatedly engaged over an extended period of engine operation, the stop allows a gradual increase in the vacuum break position to compensate for changes in engine operating characteristics.

The details as well as other features and advantages of this invention are set forth in the remainder of the specification and are shown in the drawings in which:

FIG. 1 is a schematic view of a carburetor having a choke vacuum break motor containing one embodiment of the malleable stop provided by this invention;

FIG. *2a* is an isolated view of the stop shown in FIG. 1 which has been enlarged for clarity of detail (the section line for this Figure being indicated by line *2a*—*2a* of FIG. *2b*);

FIG. *2b* is an end view of the FIG. *2a* stop as indicated by the line *2b*—*2b* of FIG. *2a;*

FIGS. *3a* and *3b*, *4a* and *4b*, *5a* and *5b*, *6a* and *6b*, *7a* and *7b*, and *8a* and *8b* are views similar to FIGS. *2a* and *2b* of six alternative embodiments of the malleable stop provided by this invention which may be employed in the FIG. 1 vacuum motor;

FIG. 9 is a view of another choke vacuum break motor containing another embodiment of the malleable stop provided by this invention;

FIG. *10a* is an enlarged isolated view of the stop shown in FIG. 9, illustrating its construction prior to installation;

FIG. *10b* is an end view of the FIG. *10a* stop as indicated by the line *10b*—*10b* of FIG. *10a;*

Figure 12:
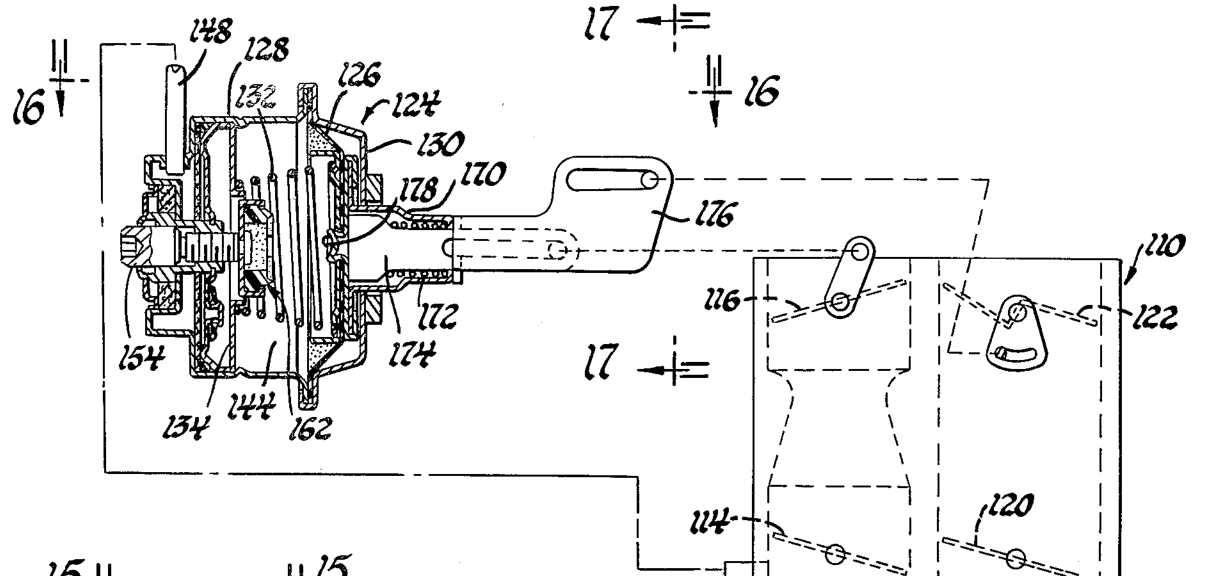
FIG. 12 is a schematic view of a carburetor having a choke vacuum break and air valve damping motor containing yet another embodiment of the malleable stop provided by this invention.
Figure 13:
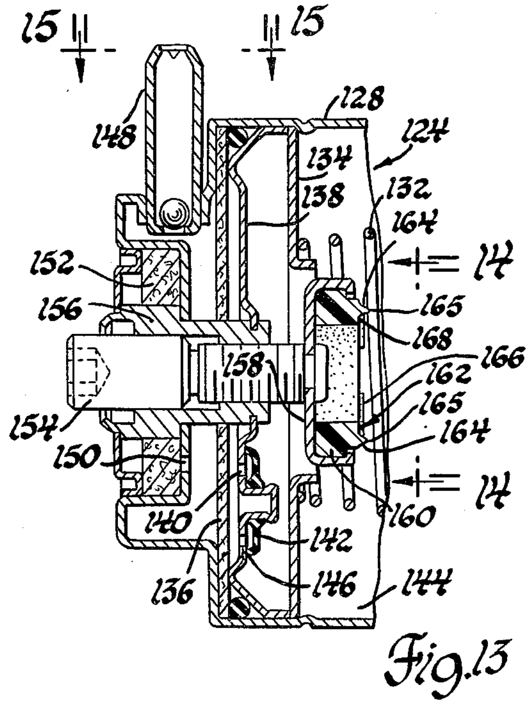
FIG. 13 is a view of the left-hand portion of the FIG. 12 vacuum motor which has been enlarged for clarity of detail.
Figure 15:
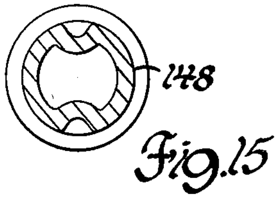
Figure 16:
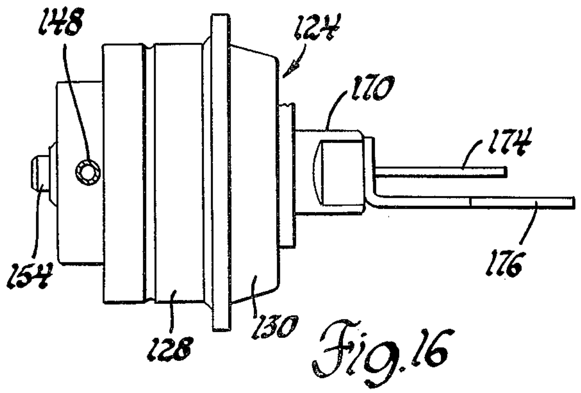
Figure 17:
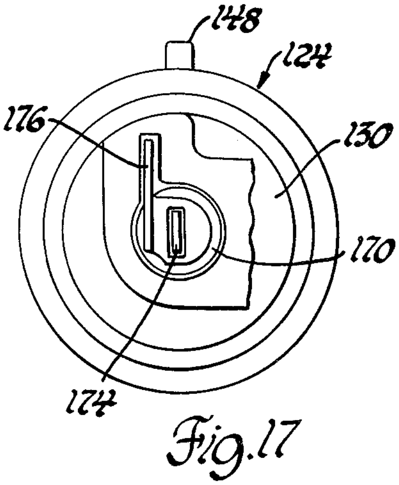

FIG. 15 is a sectional view along line 15—15 of FIG. 13 illustrating the configuration at the end of the vacuum fitting; and FIG. 16 is a plan view of the FIG. 12 vacuum motor as indicated by the line 16—16 of FIG. 12 and FIG. 17 is an end view of the FIG. 12 vacuum motor as indicated by the line 17—17 of FIG. 12, both showing the orientation of the actuating links.

Figure 1:
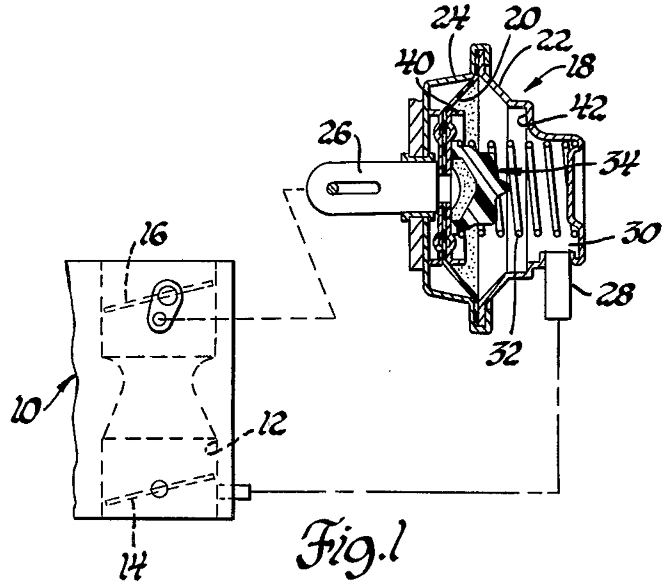
Figure 2A:
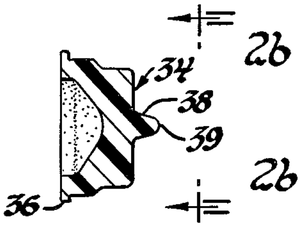
Figure 2B:
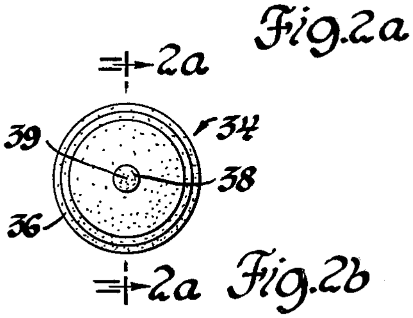

Referring first to FIG. 1, an internal combustion engine carburetor 10 has an induction passage 12 controlled by a throttle 14 and a choke 16. As is well-known, choke 16 increases fuel flow during starting and low temperature operation to provide the enriched air-fuel mixture required for proper engine operation under such conditions. Choke 16 is generally biased to the closed position shown by a thermostat which decreases its choke closing bias as operating temperatures increase.

A choke vacuum break motor 18 has an actuating diaphragm assembly 20 secured between a base member 22 and a cover member 24. An actuating link 26 included as part of diaphragm assembly 20 is connected to choke 16. A vacuum fitting 28 subjects the vacuum chamber 30 between diaphragm assembly 20 and base member 22 to the manifold vacuum in induction passage 12 downstream of throttle 14. Thus when manifold vacuum increases after the engine starts, diaphragm assembly 20 will be drawn back against the bias of a spring 32 and link 26 will pull choke 16 to a partially open vacuum break position.

A stop 34, also shown in FIGS. *2a* and *2b*, is disposed between diaphragm assembly 20 and base member 22 and has a flange 36 receiving spring 32 so that stop 34 is held against and moves with diaphragm assembly 20. Stop 34 has a large conical projection 38 with a spherical tip 39 which engages base member 22 to stop rightward movement of diaphragm assembly 20 and thus establish the vacuum break position.

As projection 38 engages base member 22 it plastically deforms slightly and thus gradually changes the vacuum break position, allowing diaphragm assembly 20 to move choke 16 to a slightly increased vacuum break position. After repeated engagement over an extended period of engine operation—for example, after 1500 engagements which would occur in the course of approximately 30,000 miles of operation in a vehicle—projection 38 deforms sufficiently to allow the diaphragm assembly backing plate 40 to engage a shoulder 42 in base member 22. Thereafter, the vacuum break position will be established by engagement of backing plate 40 with shoulder 42, rather than by engagement of projection 38 with base member 22, and will remain unchanged during further engine operation.

We have found that stop 34 deforms appropriately when formed of a malleable material such as an acetal copolymer—for example, a material known by the tradename "Celcon" available from Celanese Chemical Co. or a material known by the tradename "Delrin"

available from E. I. DuPont de Nemours & Co.—or a zinc alloy with the following composition:

| | | |
|---|---|---|
| aluminum | 4.0–4.4% | |
| copper | 0.75–1.25% | |
| magnesium | 0.02–0.04% | |
| iron | 0.08% maximum | |
| lead | 0.005% maximum | (0.007% maximum) |
| cadmium | 0.004% maximum | |
| tin | 0.001% maximum | |
| nickel | 0.030% maximum | |
| zinc | remainder | |

With these materials, projection 38 experiences a slight plastic deformation upon each engagement between actuating diaphragm assembly 20 and base member 22. After repeated engagement over an extended period of engine operation, projection 38 experiences a cumulative deformation sufficient to change the vacuum break position by the desired amount. Stop 34 thus allows a gradual increase in the vacuum break position to compensate for changes in engine operating characteristics.

It will be appreciated that the gradual deformation of stop 34 is the most important characteristic of this invention. Others have considered an ablative stop which was molded from ordinary core sand and disintegrated to change the curb idle position of a throttle. However, an ablative stop does not provide a change in engine control element position of the slight amount required upon each engagement and does not provide a position change in the repeatable manner which is required for predictable engine operation. The malleable stop provided by this invention, on the other hand, does provide a slight change in the choke vacuum break position in a repeatable manner to assure predictable engine operation.

Moreover, it will be appreciated that the malleable stop provided by this invention may find application in establishing a stopped position for engine control elements other than the carburetor choke.

Figure 3A:
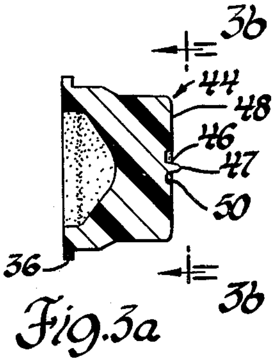
Figure 3B:
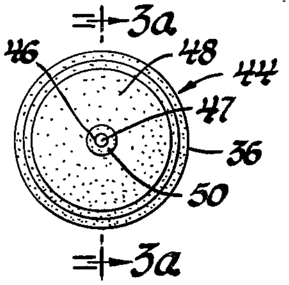

The malleable stop 44 shown in FIGS. 3*a* and 3*b* may be used in vacuum motor 18 in place of stop 34. Stop 44 has a small central conical projection 46 with a spherical tip 47. Projection 46 is surrounded by a peripheral annular plateau area 48 and separated therefrom by an intermediate annular recessed region 50. After predetermined plastic deformation of projection 46 due to repeated engagement with base member 22, plateau area 48 will engage base member 22 and further compensation of the vacuum break position due to deformation of projection 46 will cease.

It will be appreciated that engagement of plateau area 48 with base member 22 corresponds to engagement of diaphragm assembly backing plate 40 with shoulder 42. However, with both projection 46 and plateau area 48 integrated into stop 44, the cumulative deformation and thus the increase in the vacuum break position may be selected without considering the tolerances involved in engagement of backing plate 40 with shoulder 42.

Figure 4A:
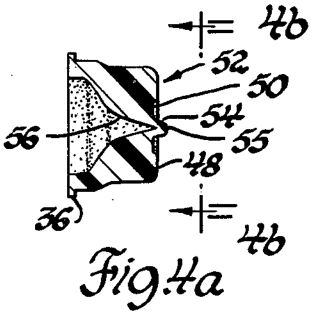
Figure 4B:
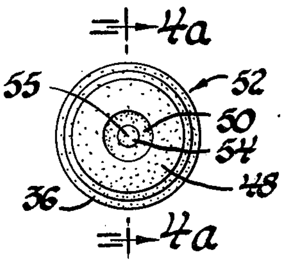

The malleable stop 52 shown in FIGS. 4*a* and 4*b* is similar to stop 44 and has a small central conical projection 54 with a spherical tip 55. Projection 54 also is surrounded by a peripheral annular plateau area 48 and separated therefrom by an intermediate annular recessed region 50. In this embodiment, however, a conical recess 56 causes projection 54 to be hollow.

Figure 5A:
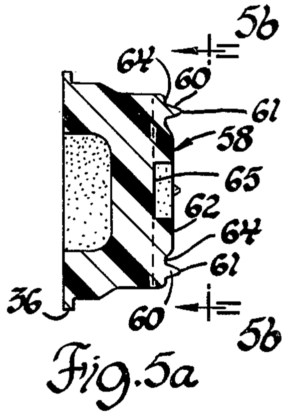
Figure 5B:
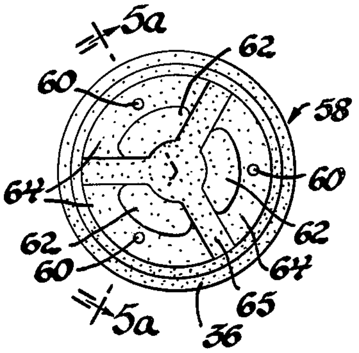

The malleable stop 58 shown in FIGS. 5*a* and 5*b* has three small conical projections 60, each with a spherical tip 61, disposed in a circle and spaced from three central arcuate plateau areas 62 by the surrounding arcuate recessed regions 64. The three-legged depression 65 dividing areas 62 and regions 64 is provided for a purpose indicated below.

Figure 6A:
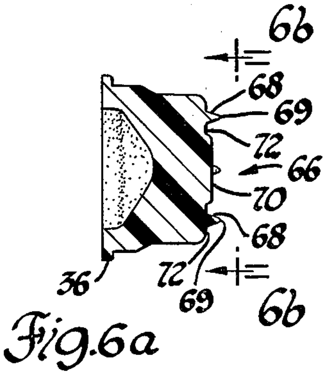
Figure 6B:
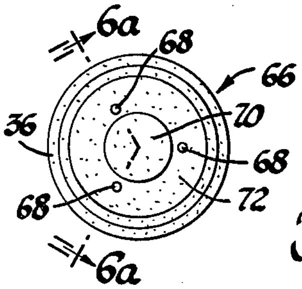

The malleable stop 66 shown in FIGS. 6*a* and 6*b* has three small conical projections 68, each with a spherical tip 69, disposed in a circle and separated from a central circular plateau area 70 by the surrounding annular recessed region 72.

Figure 7A:
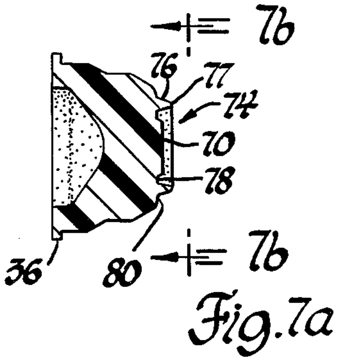
Figure 7B:
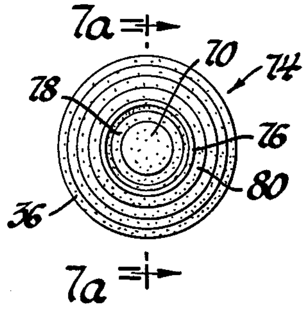

The malleable stop 74 shown in FIGS. 7*a* and 7*b* has an annular cylindrical projection 76 of triangular cross-section with a rounded tip 77 and is separated from a central circular plateau area 70 by an intermediate annular recessed region 78. An additional peripheral annular recessed region 80 surrounds projection 76.

Figure 8A:
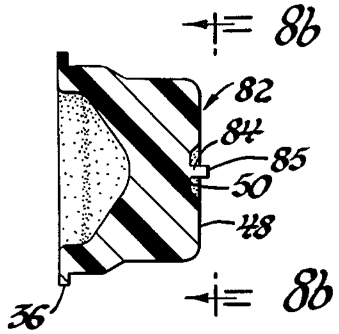
Figure 8B:
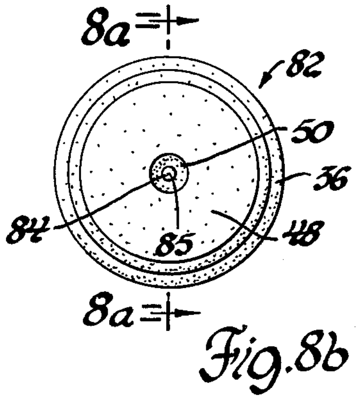

The malleable stop 82 shown in FIGS. 8*a* and 8*b* has a central cylindrical projection 84 with a flat tip 85 surrounded by peripheral annular plateau area 48 and separated therefrom by intermediate annular recessed region 50.

Stops 58, 66, 74 and 82 as well as stop 44 may be used in vacuum motor 18 in place of stop 34, each having a flange 36 to receive spring 32 and each being formed of a malleable material such as an acetal copolymer or a zinc alloy as indicated above.

Figure 9:
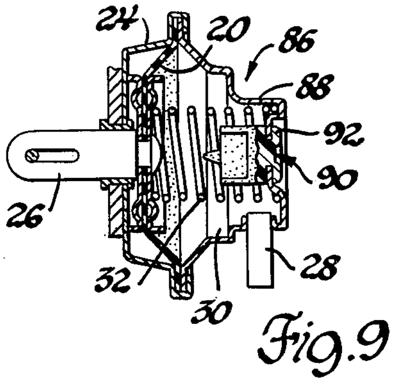

The choke vacuum break motor 86 shown in FIG. 9 also has an actuating diaphragm assembly 20 clamped between a base member 88 and a cover member 24 with an actuating link 26 connected to open choke 16. A vacuum fitting 28 directs manifold vacuum to the vacuum chamber 30 between diaphragm assembly 20 and base member 88 to move diaphragm assembly 20 against the bias of spring 32 and pull choke 16 to the vacuum break position.

Figure 10A:
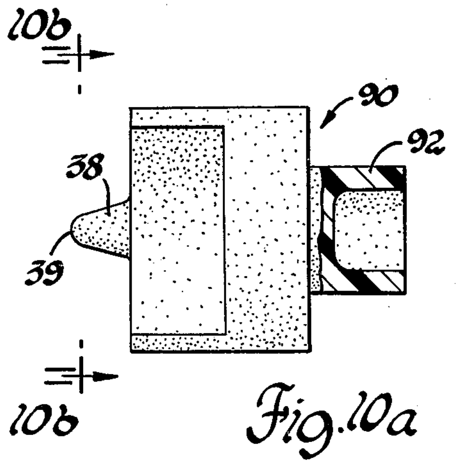
Figure 10B:
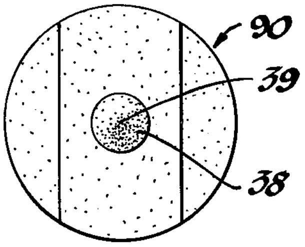

A malleable stop 90, also shown in FIGS. 10*a* and 10*b*, has a tail 92 which extends through an opening in base member 88 and is spun over to secure stop 90 to base member 88.

Stop 90 is similar to stop 34 and has a large conical projection 38 with a spherical tip 39. However, stop 90 is secured to base member 88 (rather than actuating diaphragm assembly 20), and projection 38 engages actuating diaphragm assembly 20 (rather than the base member) to establish the vacuum break position.

Stop 90 is formed of a malleable material such as an acetal copolymer or a zinc alloy as indicated above and, as in stop 34, projection 38 plastically deforms slightly upon engagement and thus gradually changes the vacuum break position.

Figure 11:
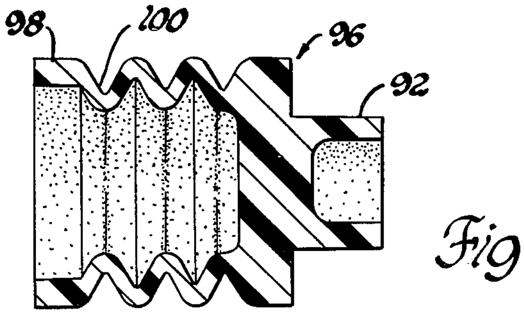
FIG. 11 is a view similar to that of FIG. *10a* of an alternative embodiment of the malleable stop provided by this invention which may be used in the FIG. 9 vacuum motor.

The malleable stop 96 shown in in FIG. 11 also has a tail 92 and may be used in vacuum motor 86 in place of stop 90. Stop 96 has a cylindrical projection 98 of corrugated configuration as indicated at 100 for slight plastic deformation upon engagement by diaphragm assembly 20.

Referring now to FIGS. 12 and 13, a carburetor 110 has a primary induction passage 112 controlled by a throttle 114 and a choke 116 and a secondary induction passage 118 controlled by a throttle 120 and an air valve 122. As is well-known, choke 116 provides the enriched air-fuel mixture required for starting and low temperature operation and air valve 122 controls fuel flow to secondary induction passage 118.

A choke vacuum break and air valve damping motor 124 has an actuating diaphragm assembly 126 secured between a base member 128 and a cover member 130. A spring 132 is disposed between diaphragm assembly 126 and a spring seat 134 mounted within base member 128. A paper filter 136 is supported by a retainer plate 138 having openings 140. A flexible umbrella value 142 overlies openings 140 and permits rapid flow through filter 136 into the vacuum chamber 144 between base member 128 and diaphragm assembly 126 but restricts flow to pass through a notch 146 in the opposite direction.

A vacuum fitting 148 is connected to apply the manifold vacuum in induction passage 112 downstream of throttle 114 to chamber 144. A small hole 150 in base member 128 is covered by a felt filter 152 and allows air to flow into vacuum fitting 148 to protect against the entry of contaminants into chamber 144.

Figure 14:
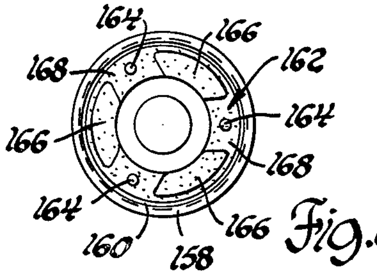
FIG. 14 is an end view of the stop shown in FIGS. 12 and 13 as indicated by the line 14—14 in FIG. 13.

A threaded stud 154 is carried in a boss 156 secured to retainer plate 138 and supports a stop plate 158 in the central opening of spring seat 134. The lip of stop plate 158 is spun over the flange 160 of a malleable stop 162. Stop 162 has three small conical projections 164, each with a spherical tip 165, disposed in a circle and separated from three arcuate plateau areas 166 by the surrounding arcuate recessed regions 168 as shown in FIG. 14.

In operation, manifold vacuum in vacuum chamber 144 pulls actuating diaphragm assembly 126 leftwardly against the bias of spring 132 until diaphragm assembly 126 engages projections 164. Projections 164 plastically deform slightly upon engagement so that over an extended period of engine operation stop 162 gradually permits slightly increased travel of diaphragm assembly 126. Eventually, projections 164 will deform sufficiently to allow diaphragm assembly 126 to engage plateau areas 166 which then establish the travel of diaphragm assembly 126.

As shown in FIG. 12, a cupped member 170 is included as part of diaphragm assembly 126 and contains a bucking spring 172 which biases an actuating link 174 to move with diaphragm assembly 126. Thus as diaphragm assembly 126 is pulled to the left, its force will be transmitted through bucking spring 172 and actuating link 174 to pull choke 116 to the vacuum break position.

An actuating link 176 is secured to cupped member 170 and connected to air valve 122 to limit and thus dampen opening movement of air valve 122 according to the vacuum in chamber 144.

It will be appreciated that stop 162 could be used in vacuum motor 18 in place of stop 34, with flange 160 received by spring 32, and that stops 34, 44, 52, 58, 66, 74 and 82 could be used in vacuum motor 124 in place of stop 162, with flanges 36 received by the lip of stop plate 158. Stop 58 is particularly adapted for use in vacuum motor 124, for depression 65 will receive the rearward extension 178 of diaphragm assembly 126.

The embodiments of the invention in which an exclusive property or privilege is claimed are defined as follows:

1. In an internal combustion engine having a choke valve controlling operation of the engine and an actuating member for moving said choke valve and a stop engageable between said actuating member and a base member to establish a stopped position for said choke valve, the improvement provided by forming said stop with a malleable portion which plastically deforms slightly upon engagement between said members and thus gradually changes said stopped position to compensate for changes in engine operating characteristics over an extended period of engine operation.

2. In an internal combustion engine having a control element controlling operation of the engine and an actuating member for moving said element and a stop engageable between a base member and said actuating member to establish a stopped position for said element, the improvement provided by forming said stop with a malleable projection which plastically deforms slightly upon engagement between said members and thus gradually changes said stopped position to compensate for changes in engine operating characteristics over a prolonged period of engine operation, and wherein said projection is formed as a hollow cone.

3. In an internal combustion engine having a choke valve controlling operation of the engine and an actuating member for moving said choke valve and a stop engageable between a base member and said actuating member to establish a stopped position for said choke valve, the improvement provided by forming said stop with a malleable projection which plastically deforms slightly upon engagement between said members and thus gradually changes said stopped position to compensate for changes in engine operating characteristics over a prolonged period of engine operation, and wherein said projection is formed as a solid cone.

4. In an internal combustion engine having a control element controlling operation of the engine and an actuating member for moving said element and a stop engageable between a base member and said actuating member to establish a stopped position for said element, the improvement provided by forming said stop with a malleable projection which plastically deforms slightly upon engagement between said members and thus gradually changes said stopped position to compensate for changes in engine operating characteristics over a prolonged period of engine operation, and wherein said projection is formed as a cone having a partially spherical tip.

5. In an internal combustion engine having a control element controlling operation of the engine and an actuating member for moving said element and a stop engageable between a base member and said actuating member to establish a stopped position for said element, the improvement provided by forming said stop with a malleable projection which plastically deforms slightly upon engagement between said members and thus gradually changes said stopped position to compensate for changes in engine operating characteristics over a prolonged period of engine operation, and wherein said projection is formed as a cylinder.

6. In an internal combustion engine having a control element controlling operation of the engine and an actuating member for moving said element and a stop engageable between a base member and said actuating member to establish a stopped position for said element, the improvement provided by forming said stop with a malleable projection which plastically deforms slightly upon engagement between said members and thus gradually changes said stopped position to compensate for changes in engine operating characteristics over a prolonged period of engine operation, and wherein said projection is formed as a circular ring.

7. In an internal combustion engine having a control element controlling operation of the engine and an actuating member for moving said element and a stop engageable between a base member and said actuating member to establish a stopped position for said element, the improvement provided by forming said stop with a malleable projection which plastically deforms slightly upon engagement between said members and thus gradually changes said stopped position to compensate for changes in engine operating characteristics over a prolonged period of engine operation, and wherein said projection is formed by three cones equally spaced in a circular pattern.

8. In an internal combustion engine having a control element controlling operation of the engine and an actuating member for moving said element and a stop engageable between a base member and said actuating member to establish a stopped position for said element, the improvement provided by forming said stop with a malleable projection which plastically deforms slightly upon engagement between said members and thus gradually changes said stopped position to compensate for changes in engine operating characteristics over a prolonged period of engine operation, and wherein said projection is comprised of zinc.

9. In an internal engine having a control element controlling operation of the engine and an actuating member for moving said element and a stop engageable between a base member and said actuating member to establish a stopped position for said element, the improvement provided by forming said stop with a malleable projection which plastically deforms slightly upon engagement between said members and thus gradually changes said stopped position to compensate for changes in engine operating characteristics over a prolonged period of engine operation, and wherein said projection is comprised of an acetal copolymer.

10. In an internal combustion engine having a control element controlling operation of the engine and an actuating member for moving said element and a stop engageable between a base member and said actuating member to establish a stopped position for said element, the improvement provided by forming said stop with a malleable projection which plastically deforms slightly upon engagement between said members and thus gradually changes said stopped position to compensate for changes in engine operating characteristics over a prolonged period of engine operation, a recessed region surrounding said projection, and a plateau area separated from said projection by said recessed region, said plateau area being engaged after predetermined deformation of said projection to limit further changes in said stopped position.

11. In a vacuum actuator in combination with an internal combustion engine having a control element controlling operation of the engine, said actuator including a base member defining a portion of a vacuum chamber, a pressure responsive actuating member closing said chamber and including means for moving said control element upon application of vacuum to said chamber, and a stop mounted on one of said members and engaged between said members to establish a stopped position for said control element when vacuum is applied to said chamber, the improvement provided by forming said stop of a malleable material which plastically deforms slightly upon engagement between said members and thus gradually changes said stopped position to compensate for changes in engine operating characteristics over an extended period of engine operation.

12. In a vacuum actuator in combination internal combustion with an engine having a choke valve controlling operation of the engine, said actuator including a base member defining a portion of a vacuum chamber, a pressure responsive actuating member closing said chamber and including means for opening said choke valve upon application of vacuum to said chamber, and a stop mounted on one of said members and engaged between said members to establish the position to which said choke is moved when vacuum is applied to said chamber, the improvement provided by a malleable projection on said stop which plastically deforms slightly upon engagement between said members and thus gradually changes said position to compensate for changes in engine operating characteristics over an extended period of engine operation, a recessed region on said stop surrounding said projection and a plateau area on said stop separated from said projection by said recessed region, said plateau area being engaged after predetermined deformation of said projection to limit further changes in said position.

13. In a vacuum actuator in combination with an internal combustion engine having a choke valve controlling operation of the engine, said actuator including a base member defining a portion of a vacuum chamber, a pressure responsive actuating member closing said chamber and including means for opening said choke valve upon application of vacuum to said chamber, and a stop mounted on one of said members and engaged between said members to establish the position to which said choke is moved when vacuum is applied to said chamber, the improvement provided by a malleable projection on said stop which plastically deforms slightly upon engagement between said members and thus gradually changes said position to compensate for changes in engine operating characteristics over an extended period of engine operation, said projection being comprised of a material selected from zinc and an acetal copolymer, a recessed region on said stop surrounding said projection and a plateau area on said stop separated from said projection by said recessed region, said plateau area being engaged after predetermined deformation of said projection to limit further changes in said position.

14. In a vacuum actuator in combination with an internal combustion engine having a choke valve controlling operation of the engine, said actuator including a base member defining a portion of a vacuum chamber, a pressure responsive actuating member closing said chamber and including means for opening said choke valve upon application of vacuum to said chamber, and a stop mounted on one of said members and engaged between said members to establish the position to which said choke is moved when vacuum is applied to said chamber, the improvement provided by a malleable projection on said stop which plastically deforms slightly upon engagement between said members and thus gradually changes said position to compensate for changes in engine operating characteristics over an extended period of engine operation, said projection being formed as a cylinder, said projection being comprised of a material selected from zinc and an acetal copolymer, a recessed region on said stop surrounding said projection and a plateau area on said stop separated from said projection by said recessed region, said plateau area being engaged after predetermined deformation of said projection to limit further changes in said position.

15. In a vacuum actuator in combination with an internal combustion engine having a choke valve controlling operation of the engine, said actuator including a base member defining a portion of a vacuum chamber, a pressure responsive actuating member closing said chamber and including means for opening said choke valve upon application of vacuum to said chamber, and a stop mounted on one of said members and engaged between said members to establish the position to which said choke is moved when vacuum is applied to said chamber, the improvement provided by a malleable projection on said stop which plastically deforms slightly upon engagement between said members and thus gradually changes said position to compensate for changes in engine operating characteristics over an extended period of engine operation, said projection being formed as a cone, said projection being comprised of a material selected from zinc and an acetal copolymer, a recessed region on said stop surrounding said projection and a plateau area on said stop separated from said projection by said recessed region, said plateau area being engaged after predetermined deformation of said projection to limit further changes in said position.

16. In a vacuum actuator in combination with an internal combustion engine having a choke valve controlling operation of the engine, said actuator including a base member defining a portion of a vacuum chamber, a pressure responsive actuating member closing said chamber and including means for opening said choke valve upon application of vacuum to said chamber, and a stop mounted on one of said members and engaged between said members to establish the position to which said choke is moved when vacuum is applied to said chamber, the improvement provided by a malleable projection on said stop which plastically deforms slightly upon engagement between said members and thus gradually changes said position to compensate for changes in engine operating characteristics over an extended period of engine operation, said projection being formed as a hollow cone with a partially spherical tip, said projection being comprised of a material selected from zinc and an acetal copolymer, a recessed region on said stop surrounding said projection and a plateau area on said stop separated from said projection by said recessed region, said plateau area being engaged after predetermined deformation of said projection to limit further changes in said position.

17. In a vacuum actuator in combination with an internal combustion engine having a choke valve controlling operation of the engine, said actuator including a base member defining a portion of a vacuum chamber, a pressure responsive actuating member closing said chamber and including means for opening said choke valve upon application of vacuum to said chamber, and a stop mounted on one of said members and engaged between said members to establish the position to which said choke is moved when vacuum is applied to said chamber, the improvement provided by a malleable projection on said stop which plastically deforms slightly upon engagement between said members and thus gradually changes said position to compensate for changes in engine operating characteristics over an extended period of engine operation, said projection being formed as a solid cone with a partially spherical tip, said projection being comprised of a material selected from zinc and an acetal copolymer, a recessed region on said stop surrounding said projection and a plateau area on said stop separated from said projection by said recessed region, said plateau area being engaged after predetermined deformation of said projection to limit further changes in said position.

18. In a vacuum actuator in combination with an internal combustion engine having a choke valve controlling operation of the engine, said actuator including a base member defining a portion of a vacuum chamber, a pressure responsive actuating member closing said chamber and including means for opening said choke valve upon application of vacuum to said chamber, and a stop mounted on one of said members and engaged between said members to establish the position to which said choke is moved when vacuum is applied to said chamber, the improvement provided by a malleable projection on said stop which plastically deforms slightly upon engagement between said members and thus gradually changes said position to compensate for changes in engine operating characteristics over an extended period of engine operation, said projection being formed as three cones with partially spherical tips equally spaced in a circular pattern, said projection being comprised of a material selected from zinc and an acetal copolymer, a recessed region on said stop surrounding said projection and a plateau area on said stop separated from said projection by said recessed region, said plateau area being engaged after predetermined deformation of said projection to limit further changes in said position.

19. In a vacuum actuator in combination with an internal combustion engine having a choke valve controlling operation of the engine, said actuator including a base member defining a portion of a vacuum chamber, a pressure responsive actuating member closing said chamber and including means for opening said choke upon application of vacuum to said chamber, and a stop mounted on one of said members and engaged between said members to establish the position to which said choke is moved when vacuum is applied to said chamber, the improvement provided by a malleable projection on said stop which plastically deforms slightly upon engagement between said members and thus gradually changes said position to compensate for changes in engine operating characteristics over an extended period of engine operation, said projection being formed as a circular ring, said projection being comprised of a material selected from zinc and an acetal copolymer, a recessed region on said stop surrounding said projection and a plateau area on said stop separated from said projection by said recessed region, said plateau area being engaged after predetermined deformation of said projection to limit further changes in said position.

* * * * *

UNITED STATES PATENT AND TRADEMARK OFFICE

CERTIFICATE OF CORRECTION

PATENT NO. : 4271094

DATED : June 2, 1981

INVENTOR(S) : L. Kirk Walters, Richard K. Judd, Terrance J. Atkins

It is certified that error appears in the above-identified patent and that said Letters Patent are hereby corrected as shown below:

Column 5, line 3, "value" should read -- valve --

Column 7, line 19, after "internal" insert -- combustion --

Column 7, lines 64-65, after "combination" delete "internal combustion" and before "engine" insert -- internal combustion --

Column 10, line 40, after "choke" insert -- valve --

Signed and Sealed this

*Sixth* Day of *October 1981*

[SEAL]

*Attest:*

GERALD J. MOSSINGHOFF

*Attesting Officer* *Commissioner of Patents and Trademarks*